(12) United States Patent
Lee

(10) Patent No.: US 10,139,226 B2
(45) Date of Patent: Nov. 27, 2018

(54) CONTROL MOMENT GYROSCOPE

(71) Applicant: KOREA AEROSPACE RESEARCH INSTITUTE, Daejeon (KR)

(72) Inventor: Seon Ho Lee, Daejeon (KR)

(73) Assignee: KOREA AEROSPACE RESEARCH INSTITUTE, Daejeon (KR)

( * ) Notice: Subject to any disclaimer, the term of this patent is extended or adjusted under 35 U.S.C. 154(b) by 384 days.

(21) Appl. No.: 14/777,682

(22) PCT Filed: Oct. 25, 2013

(86) PCT No.: PCT/KR2013/009575
§ 371 (c)(1),
(2) Date: Sep. 16, 2015

(87) PCT Pub. No.: WO2014/157798
PCT Pub. Date: Oct. 2, 2014

(65) Prior Publication Data
US 2016/0298962 A1 Oct. 13, 2016

(30) Foreign Application Priority Data

Mar. 25, 2013 (KR) .................. 10-2013-0031699
Aug. 14, 2013 (KR) .................. 10-2013-0096291

(51) Int. Cl.
*G01C 19/30* (2006.01)
*G01C 19/06* (2006.01)
(Continued)

(52) U.S. Cl.
CPC ............ *G01C 19/30* (2013.01); *B62D 37/06* (2013.01); *B64C 17/06* (2013.01); *B64G 1/28* (2013.01);
(Continued)

(58) Field of Classification Search
CPC .......... B64G 1/28; B64G 1/286; G01C 19/02; G01C 19/08; G01C 19/30; G01C 19/04;
(Continued)

(56) References Cited

U.S. PATENT DOCUMENTS 3,027,471 A * 3/1962 Burgwin ................ G01C 19/08
74/5.7
3,274,666 A * 9/1966 Nordsieck ............ G01C 25/005
74/5.95
(Continued)

FOREIGN PATENT DOCUMENTS

EP 2 080 701 A1 7/2009
EP 2 263 937 A1 12/2010
(Continued)

*Primary Examiner* — Victor L MacArthur
*Assistant Examiner* — Joseph Brown
(74) *Attorney, Agent, or Firm* — Rabin & Berdo, P.C.

(57) ABSTRACT

The objective of the present invention is to provide a control moment gyroscope which can be provided in a limited space since the volume thereof can be reduced without change in performance by optimizing the shapes and mounting positions of each component. To this end, the control moment gyroscope of the present invention is a control moment gyroscope for generating torque in the orthogonal directions to both of two shafts which are perpendicularly disposed to each other by rotating the two shafts, and the control moment gyroscope comprises: a gimbal motor formed in a hollow cylinder shape and supplying momentum; spin motor provided inside the gimbal motor and supplying momentum in a perpendicular direction to the momentum of the gimbal motor; and a flywheel provided in the inside of the gimbal motor and supplied with the rotational force of the gimbal motor and the rotational force of the spin motor.

16 Claims, 12 Drawing Sheets

(51) Int. Cl.
 B64C 17/06 (2006.01)
 G01C 19/08 (2006.01)
 B62D 37/06 (2006.01)
 G01C 19/16 (2006.01)
 B64G 1/28 (2006.01)
 F16F 15/30 (2006.01)

(52) U.S. Cl.
 CPC .............. *B64G 1/286* (2013.01); *F16F 15/30* (2013.01); *G01C 19/06* (2013.01); *G01C 19/08* (2013.01); *G01C 19/16* (2013.01); *B60G 2401/28* (2013.01)

(58) Field of Classification Search
 CPC ...... G01C 19/06; G05D 1/0883; B62D 37/06; B60G 2401/28; B64C 17/06
 USPC .............................................. 74/5 R, 5.4, 5.9
 See application file for complete search history.

(56) References Cited

U.S. PATENT DOCUMENTS

| | | | | |
|---|---|---|---|---|
| 3,309,931 A | * | 3/1967 | Adams | G01C 19/04 74/5.6 D |
| 3,498,144 A | * | 3/1970 | Gooss, Jr. | G01C 19/04 74/5 F |
| 3,527,108 A | * | 9/1970 | Fay | G01C 19/04 74/5 R |
| 4,426,889 A | * | 1/1984 | Schluntz | G01C 19/04 74/5 R |
| 4,466,299 A | * | 8/1984 | Mross | G01C 19/20 74/5 R |
| 5,386,738 A | | 2/1995 | Havenhill | |
| 5,425,281 A | | 6/1995 | McFall | |
| 6,834,561 B2 | | 12/2004 | Meffe | |
| 8,919,213 B2 | * | 12/2014 | Davis | G01C 19/06 74/5 R |
| 2010/0000349 A1 | * | 1/2010 | Stevens | B64G 1/286 74/5.4 |
| 2010/0006705 A1 | | 1/2010 | Faucheux et al. | |

FOREIGN PATENT DOCUMENTS

| | | |
|---|---|---|
| JP | 2009-168817 A | 7/2009 |
| KR | 10-2009-0116690 A | 11/2009 |
| WO | WO-94/14653 A1 | 7/1994 |
| WO | WO-2004/018293 A1 | 3/2004 |
| WO | WO-2005/095891 A1 | 10/2005 |

* cited by examiner (a)

(b)

CONTROL MOMENT GYROSCOPE

TECHNICAL FIELD

The present disclosure relates to a control moment gyroscope used for the purpose of position stabilization or re-orientation of a vehicle or a floating platform.

BACKGROUND ART

Generally, the control moment gyroscope (CMG) refers to a motor applied apparatus equipped with a rotor of high moment of inertia, which is used to generate torques for the purpose of position stabilization and re-orientation of a vehicle or a floating platform such as satellite, ship, submarine, automobile, aircraft, missile, and so on.

Such control moment gyroscope is a torque generating actuator that uses the gyroscopic principle of the physics, and as illustrated in FIG. 1, it includes a flywheel 21, a spin motor 20, and a gimbal motor 10. Specifically, the flywheel 21 is mounted to a rotating axis of the spin motor 20, and the rotating axis of the gimbal motor 10 is disposed perpendicularly to the rotating axis of the spin motor 20. As the spin motor 20 rotates the flywheel 21 at high speed, momentum h is generated, and as the rotating axis of the spin motor 20 is rotated (g) about the rotating axis of the gimbal motor 10 by the driving of the gimbal motor 10, torque T is generated on an axis perpendicular to these two shafts.

Hereinbelow, the conventional control moment gyroscope is described in detail with reference to FIG. 1 again.

As illustrated in FIG. 1, the gimbal motor 10 is disposed extending to the left-hand side of the drawing, and a rotating and a rotating frame 11, in a shape extending to the right-hand side of the drawing, is mounted to a rotating shaft of the gimbal motor 10 and rotated. The spin motor 20 is mounted to the rotating frame 11, and the flywheel 21 is rotated by the spin motor 20. By the configuration as described above, the rotating frame 11 is rotated, as well as the flywheel 21 is rotated in an orthogonal direction, thus generating gyroscope torque.

However, the related control moment gyroscope as described above takes up a considerable space, because of the rotating frame 11 formed on the gimbal motor 10 and extending to the right-hand side of the drawing, and the flywheel 21 of the spin motor 20 disposed on the rotating frame 11. That is, considering the storage capacity of the satellite and limited space, the space for the control moment gyroscope and mass thereof has to be reduced with respect to the respectively given momentums and torques as much as possible, but the large volume of the related control moment gyroscope described above occupies a considerable space, thus making it a difficult candidate for an actuator of small satellite.

Further, because the rotating frame 11 has a shape of an open structure supporting a portion of the side surface of the spin motor 20, there are drawbacks concerning structural integrity, stability issue occurring due to micro-vibration generated from the motor driven, and unstable heat sink characteristic of the spin motor 20 generating high temperature heat.

DISCLOSURE OF INVENTION

Technical Problem

A technical object of the present disclosure is to provide a control moment gyroscope which can be mounted even in a limited space, because the control moment gyroscope is reduced in volume, without compromising performance by way of optimization of shapes and installation positions of the respective parts.

Another technical object of the present disclosure is to provide a control moment gyroscope which can maximize symmetry of structural shape.

Yet another technical object of the present disclosure is to provide a control moment gyroscope which can improve structural integrity and stability against micro-vibration.

Solution to Problem

In order to achieve the objects mentioned above, a control moment gyroscope according to an exemplary embodiment of the present disclosure is provided to rotate two shafts disposed perpendicular to each other and generate torque in a direction orthogonal to both of the shafts, which may include a gimbal motor having a hollow cylindrical shape and supplying momentum, a spin motor provided in an inside of the gimbal motor and supplying momentum in a direction perpendicular to the momentum of the gimbal motor, and a flywheel provided in the inside of the gimbal motor and supplied with a rotating force of the gimbal motor and a rotating force of the spin motor.

The gimbal motor may include a first stator having a hollow cylindrical shape with a coil wound thereon, a first rotor in a hollow cylindrical shape, being provided at a gap with respect to the first stator, and having a permanent magnet, a first stator support in a hollow cylindrical shape and supporting the first stator, and a first rotor support supporting the first rotor, being rotatably provided on the first stator support, and comprising an insertion inserted into the first stator support.

The first stator support may include a first guidance passage in an annular shape recessed in a direction of momentum of the gimbal motor. The first stator may be fixed to the first guidance passage, and the first rotor may be rotatably inserted into the first guidance passage.

The spin motor may include a second stator in a hollow cylindrical shape with a coil wound thereon, being fixed to the insertion, and protruding in a direction perpendicular to the direction of momentum of the gimbal motor, a second rotor in a hollow cylindrical shape, being provided at a gap with respect to the second stator and supported on the flywheel, and comprising a permanent magnet, and a spin shaft rotatably provided to the insertion, forming a center of rotation of the flywheel, and having a direction perpendicular to the direction of momentum of the gimbal motor.

The flywheel may include a second guidance passage in an annular shape recessed in the direction of momentum of the spin motor. The second stator may be inserted into the second guidance passage while allowing the flywheel to rotate, and the second rotor may be fixed to the second guidance passage.

For example, the flywheel may have a sphere shape.

For another example, the flywheel may have a circular plate or elliptic plate shape.

For yet another example, the flywheel may have a circular plate or elliptic plate shape, in which case the flywheel may be positioned in a configuration in which an outer circumference thereof is penetrated by the spin shaft.

For yet another example, the flywheel may have a circular plate or elliptic plate shape, in which case the flywheel may be positioned in a configuration in which a center of a flat surface thereof is penetrated by the spin shaft.

For yet another example, the flywheel may have an elliptic plate shape elongated in a shaft direction of the spin shaft, or have an elliptic plate shape elongated in the direction of momentum of the gimbal motor.

For yet another example, the flywheel may have a rugby ball shape which is gradually increased in diameter and then gradually decreased in diameter in a shaft direction of the spin shaft, or have a rugby ball shape which is gradually increased in diameter and then gradually decreased in diameter in the direction of momentum of the gimbal motor.

For yet another example, the flywheel may consist of a plurality of circular plates or elliptic plates stacked on one another.

For yet another example, the flywheel may have any of a cylindrical shape, a sphere shape and a rugby ball shape in which a plurality of circular plates are stacked on one another in a shaft direction of the spin shaft.

For yet another example, the flywheel may have a cylindroid shape or a rugby ball shape in which a plurality of elliptic plates are stacked on one another in a shaft direction of the spin shaft.

For yet another example, the plurality of circular plates or elliptic plates, each in stepped form, may be stacked on one another along the shaft direction of the spin shaft.

According to an exemplary embodiment, the control moment gyroscope may additionally include an upper cover covering an upper opening of the gimbal motor, and a lower cover covering a lower opening of the gimbal motor.

The insertion of the first rotor support may be rotatably supported on the lower cover through a slip ring.

Advantageous Effects of Invention

As described above, the control moment gyroscope according to exemplary embodiments of the present disclosure can have effects as follows.

According to an exemplary embodiment, the optimized technical configuration is provided, in which the gimbal motor has a hollow cylindrical shape, and the spin motor and the flywheel are mounted inside the gimbal motor. Accordingly, the volume is reduced without compromising performance, and the control moment gyroscope can be mounted even in a limited space. Ultimately, the control moment gyroscope according to the exemplary embodiments can be mounted even in a limited space, thus allowing application as an actuator for small satellite. Further, maximized convenience can be provided in maintaining flexibility of arranging several control moment gyroscopes and performing repair and maintenance works.

Further, according to exemplary embodiments, the overall cylindrical shape can lead to maximized structural symmetry.

Further, according to exemplary embodiments, the spin motor is mounted inside the hollow cylindrical gimbal motor, thus forming an overall structure that is closed by the gimbal motor. Accordingly, structural integrity and stability against micro-vibration can be enhanced, and heat sink ability for the heat generated from the motor as it is driven can also be enhanced.

Further, according to exemplary embodiments, the upper cover and the lower cover are additionally included, which can lead into maximized contamination prevention and stability against external environment.

Further, according to exemplary embodiments, the flywheel can have a variety of shapes, according to which weight of the flywheel, and height or diameter of the control moment gyroscope can be reduced. Specifically, in an embodiment where a plurality of circular or elliptic plates is used to fabricate the flywheel, fabrication of sphere- or rugby ball-shaped control moment gyroscope, which is hard to fabricate in one single processing, can be facilitated.

MODE FOR CARRYING OUT THE INVENTION

Certain exemplary embodiments of the present inventive concept will now be described in greater detail with reference to the accompanying drawings. The matters defined in the description, such as detailed construction and elements, are provided to assist in a comprehensive understanding of the present inventive concept. Accordingly, it is apparent that the exemplary embodiments of the present inventive concept can be carried out without those specifically defined matters.

Figure 1:
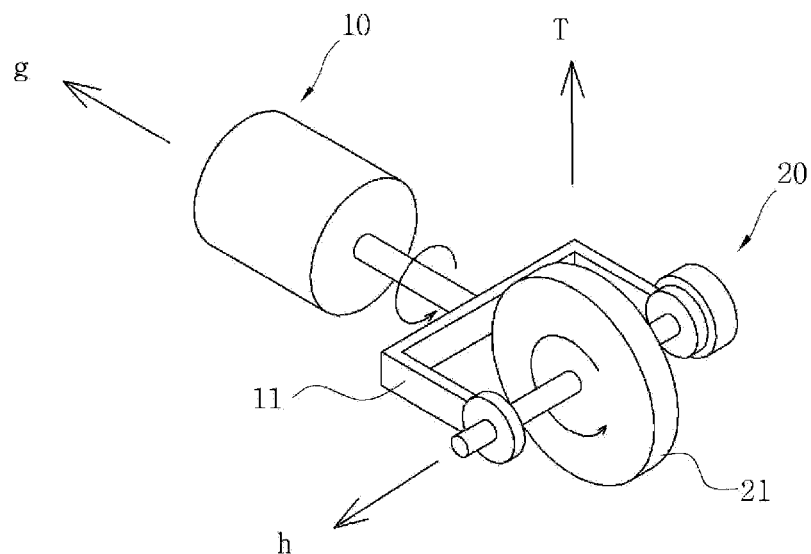
FIG. 1 is a schematic perspective view of a related control moment gyroscope.
Figure 2:
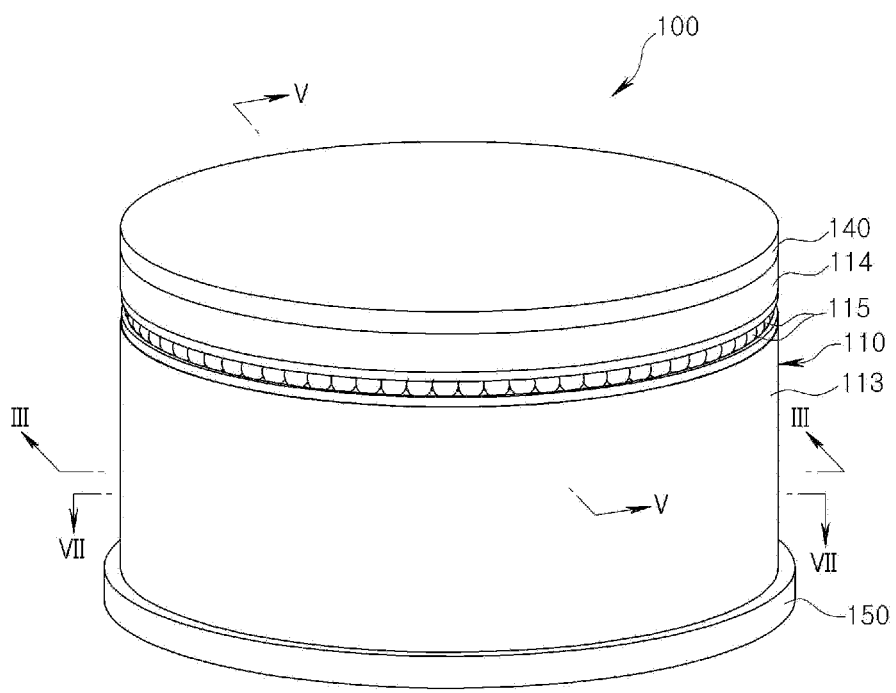
FIG. 2 is a perspective view of a control moment gyroscope according to the present disclosure.
Figure 3:
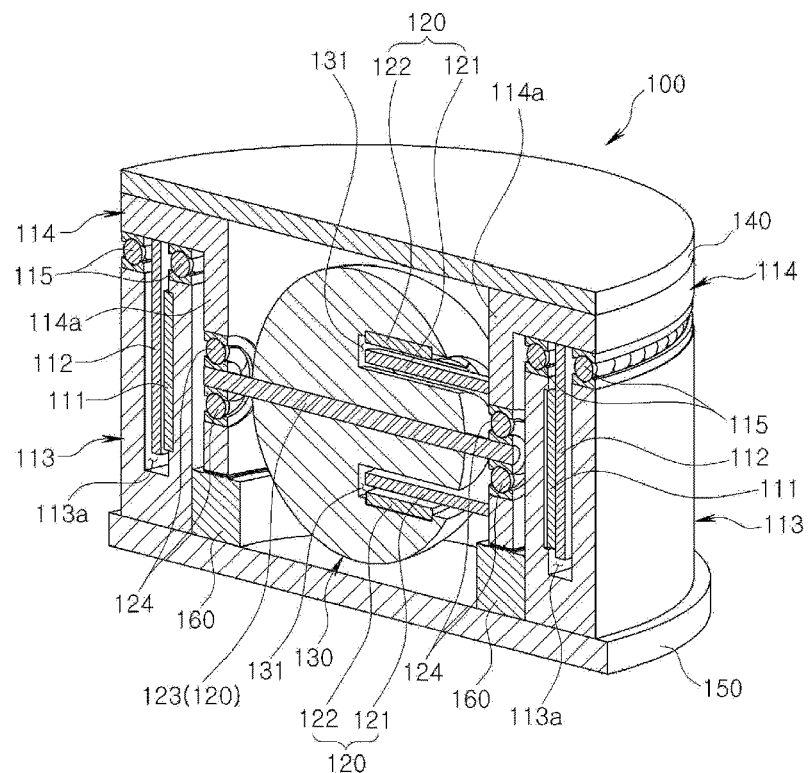
FIG. 3 is a cut-away perspective view of the control moment gyroscope of FIG. 2, taken along line III-III.
Figure 4:
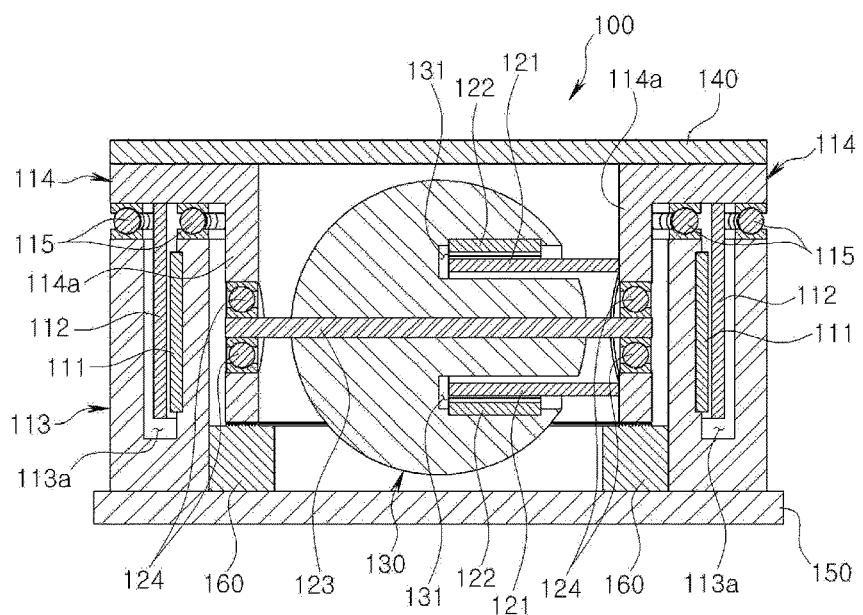
FIG. 4 is a cross sectional view of the control moment gyroscope of FIG. 2, taken along line III-III.

FIG. 2 is a perspective view of a control moment gyroscope according to the present disclosure, FIG. 3 is a cut-away perspective view of the control moment gyroscope of FIG. 2, taken along line III-III, and FIG. 4 is a cross sectional view of the control moment gyroscope of FIG. 2, taken along line III-III.

Figure 5:
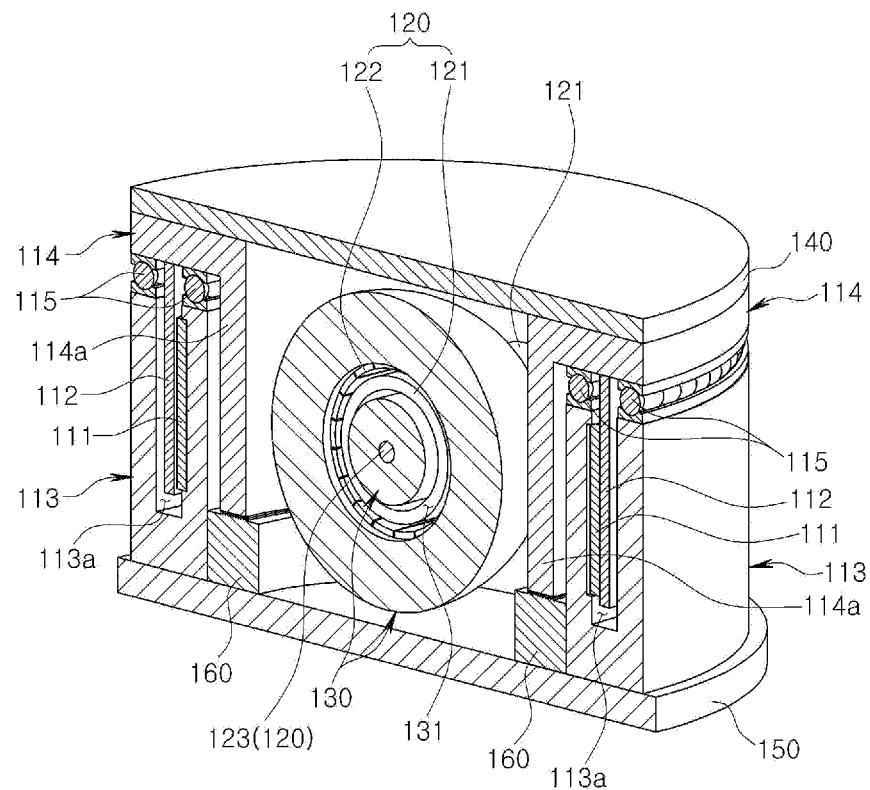
FIG. 5 is a cut-away perspective view of the control moment gyroscope of FIG. 2, taken along line V-V.
Figure 6:
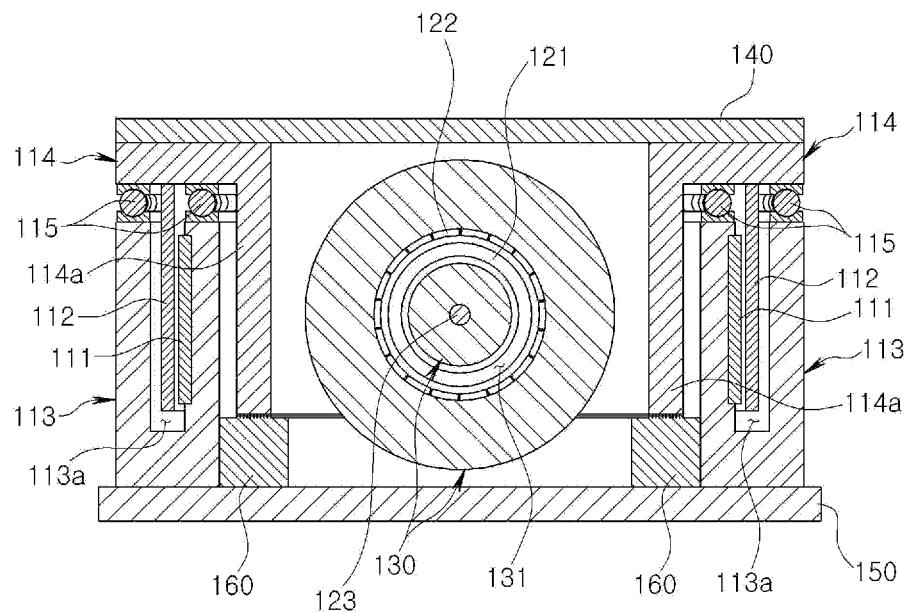
FIG. 6 is a cross sectional view of the control moment gyroscope of FIG. 2, taken along line V-V.
Figure 7:
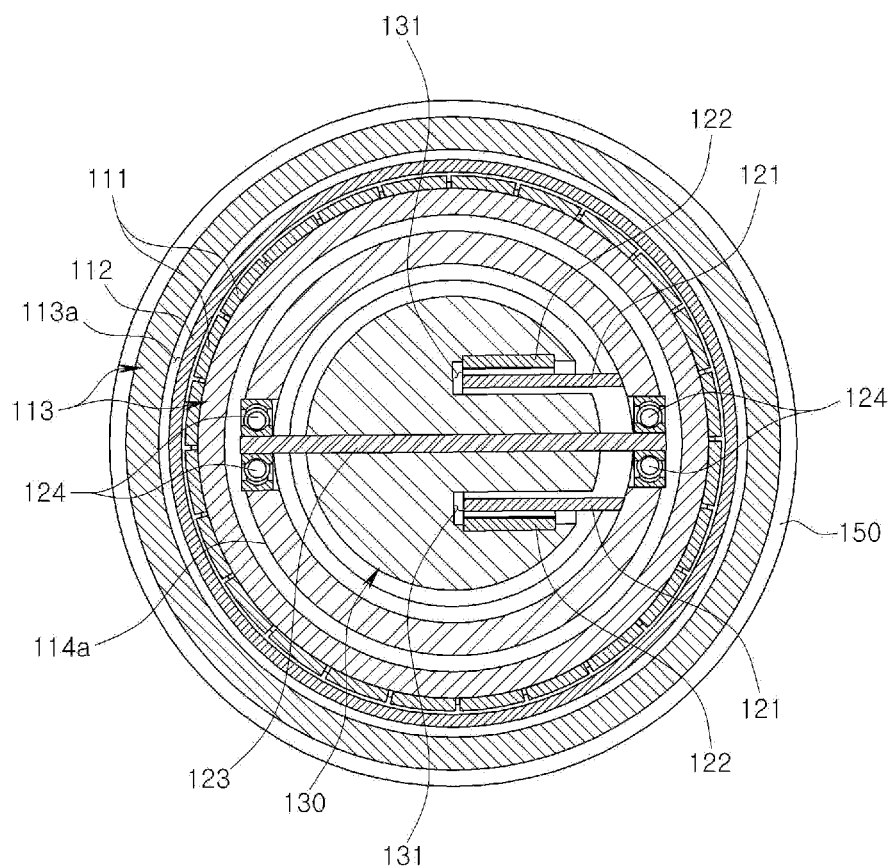
FIG. 7 is a cross sectional view of the control moment gyroscope of FIG. 2, taken along line VII-VII.

FIG. 5 is a cut-away perspective view of the control moment gyroscope of FIG. 2, taken along line V-V, FIG. 6 is a cross sectional view of the control moment gyroscope of FIG. 2, taken along line V-V, and FIG. 7 is a cross sectional view of the control moment gyroscope of FIG. 2, taken along line VII-VII.

Figure 8:
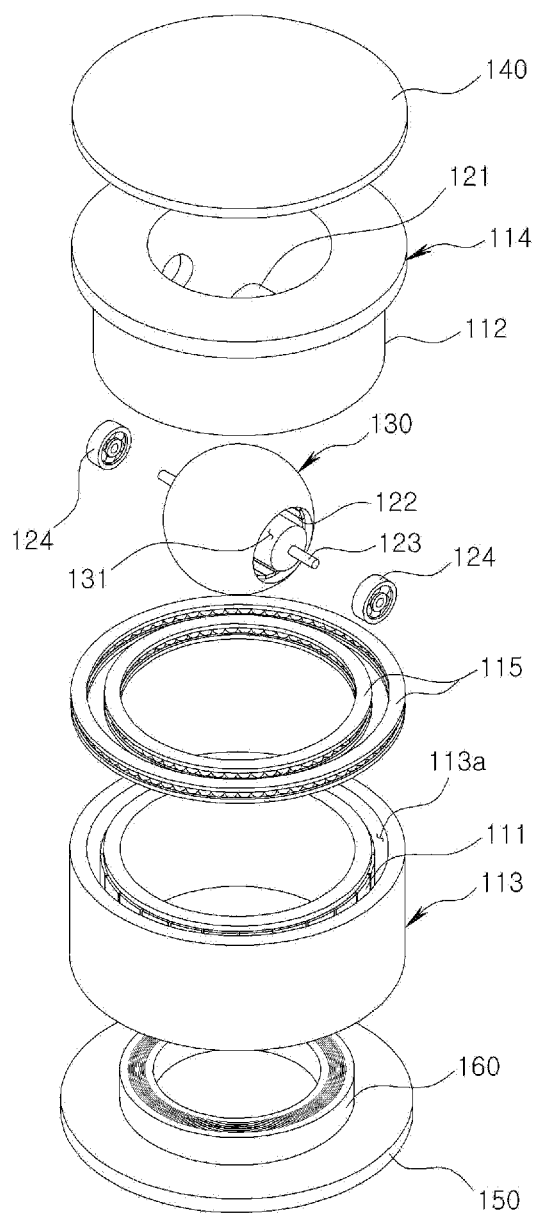
FIG. 8 is an exploded perspective view of the control moment gyroscope of FIG. 2.

FIG. 8 is an exploded perspective view of the control moment gyroscope of FIG. 2.

According to an exemplary embodiment of the present disclosure, the control moment gyroscope 100 rotates two shafts disposed in perpendicular relation with each other to generate torques in a direction orthogonal to both of the two shafts, and as illustrated in FIGS. 2 to 8, includes a gimbal motor 110, a spin motor 120 and a flywheel 130. Specifically, the spin motor 120 and the flywheel 130 are mounted inside the gimbal motor 110.

The gimbal motor 110 has a hollow cylindrical shape so as to house the spin motor 120 and the flywheel 130 therein, and also to maintain symmetry in the structural shape. The gimbal motor 110 provides momentum to a direction of the center shaft thereof. Hereinbelow, the gimbal motor 110 will be described in detail with reference to FIGS. 2 to 8.

For example, as illustrated in FIGS. 3, 7 and 8, the gimbal motor 110 may include a first stator 111, a first rotor 112, a first stator support 113, and a first rotor support 114. Specifically, as illustrated in FIG. 7, the first stator 111, the first rotor 112, the first stator support 113, and the first rotor support 114 may have a hollow (that is, empty) cylindrical shape.

The first stator 111 is fixedly provided on the first stator support 113. Although not illustrated, the first stator 111 may be formed by winding coils (not illustrated) around a plurality of cores (not illustrated), respectively. The cores are electromagnetically energized, as the electric currents are applied to the corresponding coils.

The first rotor 112 is fixedly provided on the first rotor support 114. Specifically, the first rotor 112 is provided at a gap from the first stator 111. Although not illustrated, the first rotor 112 may include a plurality of permanent magnets (not illustrated) provided on a surface facing the plurality of cores (not illustrated) mentioned above. Accordingly, under the influence of repulsive or attractive force between the corresponding magnets and the corresponding electromagnetically energized cores between the gap, the first rotor 112 and the flywheel 130 to be described below are rotated.

The first stator support 113 may not only fix the first stator 111, but also form a portion of an outer circumference of the control moment gyroscope 110 according to the present disclosure, as illustrated in FIGS. 2 and 3. Specifically, the first stator support 113 may include a first guidance passage 113a in an annular shape, which is recessed into a direction of momentum (i.e., to the center shaft) of the gimbal motor 110. Accordingly, the first stator 111 described above may be fixed in the first guidance passage 113a, and the first rotor 112 described above may be rotatably inserted into the first guidance passage 113a.

The first rotor support 114 fixes the first rotor 112, and also is configured on an end of the first stator support 113 to be rotated by a first bearing 115. Along with this, the first rotor support 114 includes a hollow cylindrical insertion 114a inserted into the first stator support 113. Specifically, a spin shaft 123 to be described below is rotatable by the second bearing 124, while being passed across the hollow cylindrical insertion 114a. Accordingly, since the spin shaft 123 is rotatably provided in the insertion 114a, which is a closed, cylindrical structure, structural integrity and stability against micro-vibration can be enhanced.

Hereinbelow, the spin motor 120 is described in detail with reference to FIGS. 3 to 8.

The spin motor 120 is provided to an inside of the gimbal motor 110 to provide a momentum in a perpendicular direction to the momentum of the gimbal motor 110. For example, as illustrated in FIGS. 3 to 8, the spin motor 120 may include a second stator 121, a second rotor 122 and a spin shaft 123.

The second stator 121 is fixedly provided in the insertion 114a. Specifically, the second stator 121 is protruded to a direction perpendicular to the direction of momentum (i.e., direction of center shaft) of the gimbal motor 110. Although not illustrated, the second stator 121 may be configured by winding coils (not illustrated) on a plurality of cores (not illustrated), respectively, as in the case of the first stator 111 described above. Accordingly, the cores are electromagnetically energized as the electric currents are applied to the corresponding coils.

The second rotor 122 is fixedly provided on the flywheel 130. Specifically, the second rotor 122 is provided at a gap from the second stator 121. Although not illustrated, the second rotor 122 may include a plurality of permanent magnets (not illustrated) provided on a surface facing the plurality of cores (not illustrated), as in the case of the first rotor 112 described above. Accordingly, under the influence of repulsive or attractive force between the corresponding magnets and the corresponding electromagnetically energized cores between the gap, the second rotor 122 and the flywheel 130 are rotated.

The spin shaft 123 is rotatably provided, while being passed across the insertion 114a in the hollow cylindrical shape described above. Accordingly, since the spin shaft 123 is rotatably provided in the insertion 114a, which is a closed, cylindrical structure, the structural integrity and the stability against micro-vibration can be enhanced. Further, the spin shaft 123 is fixedly inserted in the center of the flywheel 130, thus forming a center of rotation of the flywheel 130.

Furthermore, the spin shaft 123 has an orientation perpendicular to the direction of momentum (i.e., direction of center shaft) of the gimbal motor 110. Accordingly, since the center shaft of the gimbal motor 110 and the spin shaft 123 fixed to the flywheel 130 are disposed in a perpendicular relation with each other, torques orthogonal to both of the two shafts can be generated during respective rotation thereof.

Hereinbelow, the flywheel 130 is described in detail again with reference to FIGS. 3 to 8.

The flywheel 130 is provided to an inside of the gimbal motor 110 and is supplied with the rotating force of the gimbal motor 110 and to the rotating force of the spin motor 120. For example, as illustrated in FIG. 3, the flywheel 130 may be provided to an inside of the insertion 114a of the first rotor support 114, and is rotatable in the insertion 114a by the spin shaft 123 of the spin motor 120. Accordingly, the flywheel 130 is supplied with the rotating force of the gimbal motor 110 and to the rotating force of the spin motor 120.

Further, the flywheel 130 may include a second guidance passage 131 in an annular shape recessed in the direction of momentum (i.e., direction of the spin shaft 123) of the spin motor 120. Accordingly, the second stator 121 described above can be inserted into the second guidance passage 131 in a manner of allowing the flywheel 130 to rotate, and the second rotor 122 described above may be fixed in the second guidance passage 131 to e rotated along with the flywheel 130.

Furthermore, the flywheel 130 may have a sphere shape which allows structural symmetric during rotation by the gimbal motor 110 and rotation by the spin motor 120, respectively.

Additionally, according to the exemplary embodiment of the present disclosure described above, the control moment gyroscope 100 may additionally include, as illustrated in FIGS. 2, 3 and 8, an upper cover 140 covering an upper opening of the gimbal motor 110, and a lower cover 150 covering a lower opening of the gimbal motor 110. Since there are the upper cover 140 covering the upper opening and the lower cover 150 covering the lower opening, in addition to the gimbal motor 110 in a hollow cylindrical shape, foreign matters are prevented from entering, and contamination prevention and stability against external environment can be maximized.

Further, the insertion 114a of the first rotors support 114 may be rotatably supported by the lower cover 150 through a slip ring 160. Accordingly, necessary electric currents can be supplied to the gimbal motor 110 and the spin motor 120, while the slip ring 160 allows free rotation.

Hereinbelow, a control moment gyroscope according to another exemplary embodiment of the present disclosure will be described with reference to FIG. 9.

Figure 9:
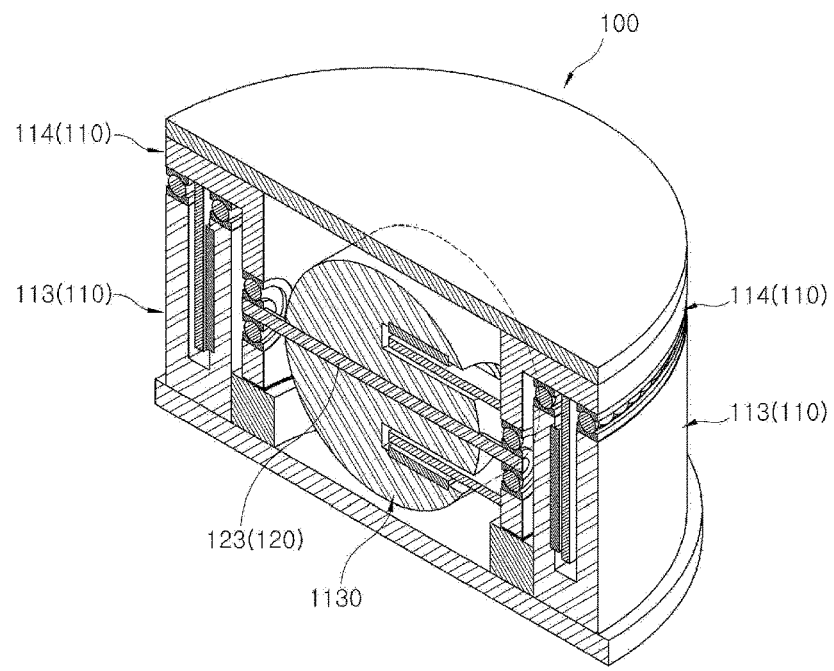
FIG. 9 is a cut-away perspective view of a control moment gyroscope according to another exemplary embodiment of the present disclosure.

FIG. 9 is a cut-away perspective view of a control moment gyroscope according to another exemplary embodiment of the present disclosure.

According to another exemplary embodiment, the control moment gyroscope as illustrated in FIG. 9 is almost similar to that according to the exemplary embodiment described above, except for the shape of the flywheel 1130. Accordingly, the flywheel 1130 is mainly described below.

The flywheel 1130 may have a circular plate shape (or disc shape). For example, as illustrated in FIG. 9, the flywheel 1130 of the circular plate shape may be positioned, with the spin shaft 123 penetrating the outer circumference thereof. That is, the flywheel 1130 of the circular plate shape may be so positioned that the center axis thereof is perpendicular to the shaft direction of the spin shaft 123, and also perpendicular with respect to the direction of momentum of the gimbal motor 110.

Accordingly, compared to the sphere-shape flywheel, weight or the like can be further reduced.

Hereinbelow, a control moment gyroscope according to yet another exemplary embodiment of the present disclosure will be described with reference to FIG. 10.

Figure 10:
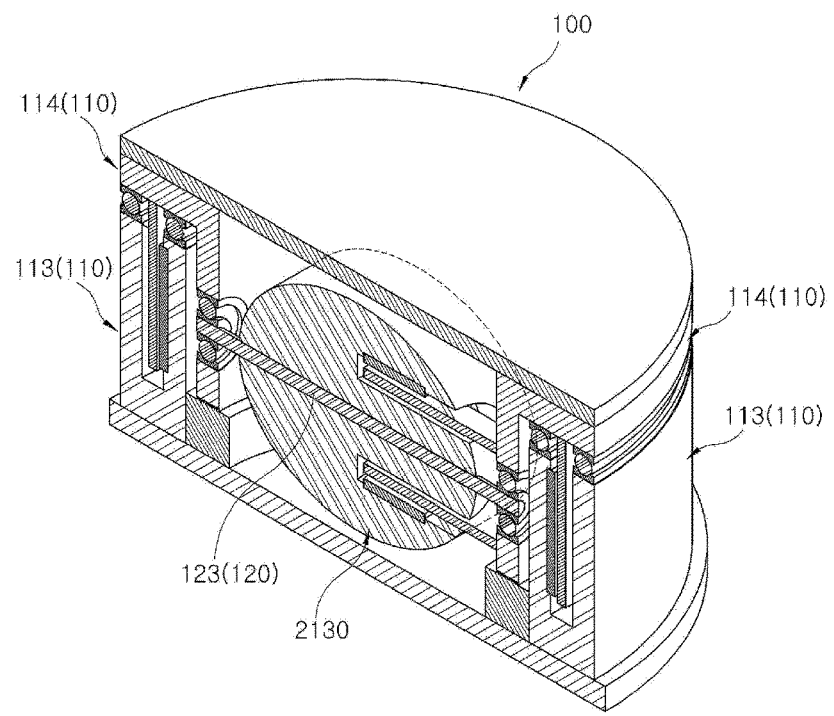
FIG. 10 is a cut-away perspective view of a control moment gyroscope according to yet another exemplary embodiment of the present disclosure.

FIG. 10 is a cut-away perspective view of a control moment gyroscope according to yet another exemplary embodiment of the present disclosure.

According to yet another exemplary embodiment, the control moment gyroscope as illustrated in FIG. 10 is almost similar to that according to the exemplary embodiment described above, except for the shape of the flywheel 2130. Accordingly, the flywheel 2130 is mainly described below.

The flywheel 2130 may have an elliptic plate shape. For example, as illustrated in FIG. 10, the flywheel 2130 in the elliptic plate shape may be elongated in the shaft direction of the spin shaft 123. In an alternative example, although not illustrated, the flywheel 2130 may be positioned so that the planar surface of the elliptic flywheel is penetrated with the spin shaft 123.

Accordingly, weight and so on can be further reduced compared to the sphere-shaped flywheel, and the height of the control moment gyroscope can be further reduced compared to the sphere- or circular plate-shaped flywheel.

Hereinbelow, a control moment gyroscope according to yet another exemplary embodiment of the present disclosure will be described with reference to FIG. 11.

Figure 11:
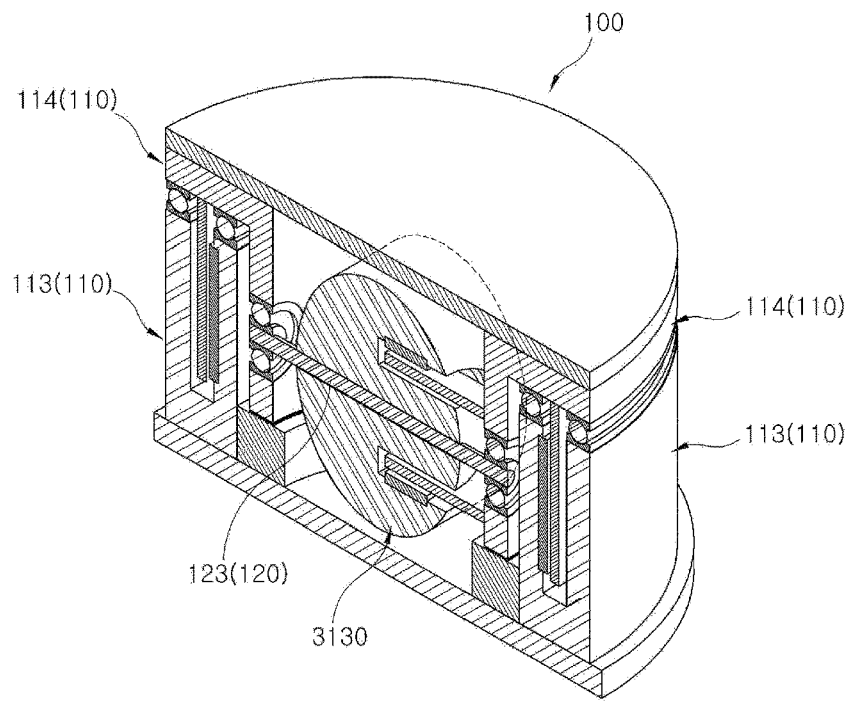
FIG. 11 is a cut-away perspective view of a control moment gyroscope according to yet another exemplary embodiment of the present disclosure.

FIG. 11 is a cut-away perspective view of a control moment gyroscope according to yet another exemplary embodiment of the present disclosure.

According to yet another exemplary embodiment, the control moment gyroscope as illustrated in FIG. 11 is almost similar to that according to the exemplary embodiment described above, except for the shape of the flywheel 3130. Accordingly, the flywheel 3130 is mainly described below.

The flywheel 3130 may have an elliptic plate shape. For example, the flywheel 3130 in the elliptic plate shape may be elongated in the direction of momentum of the gimbal motor 110.

Accordingly, weight and so on can be further reduced compared to the sphere-shaped flywheel, and overall diameter of the control moment gyroscope can be further reduced compared to the sphere- or circular plate-shaped flywheel.

Hereinbelow, a control moment gyroscope according to yet another exemplary embodiment of the present disclosure will be described with reference to FIG. 12.

Figure 12:
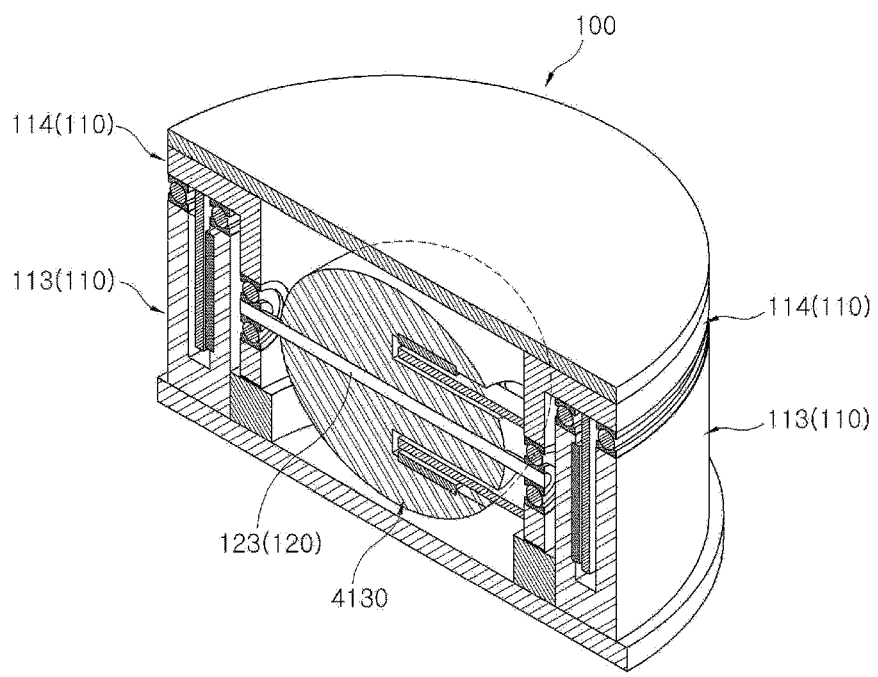
FIG. 12 is a cut-away perspective view of a control moment gyroscope according to yet another exemplary embodiment of the present disclosure.

FIG. 12 is a cut-away perspective view of a control moment gyroscope according to yet another exemplary embodiment of the present disclosure.

According to yet another exemplary embodiment, the control moment gyroscope as illustrated in FIG. 12 is almost similar to that according to the exemplary embodiment described above, except for the shape of the flywheel 4130. Accordingly, the flywheel 4130 is mainly described below.

The flywheel 4130 may roughly have a rugby ball shape. For example, the flywheel 4130 in the rugby ball shape may gradually increase in diameter and then gradually decrease in diameter in the shaft direction of the spin shaft 123.

Accordingly, the height of the control moment gyroscope can be further reduced compared to the sphere- or circular plate-shaped flywheel.

Hereinbelow, a control moment gyroscope according to yet another exemplary embodiment of the present disclosure will be described with reference to FIG. 13.

Figure 13:
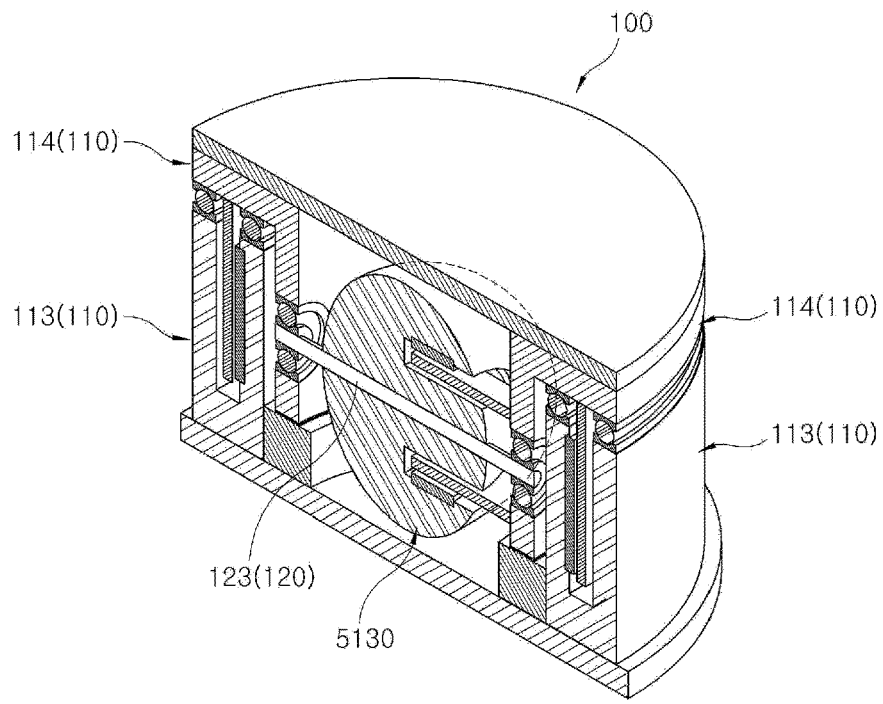
FIG. 13 is a cut-away perspective view of a control moment gyroscope according to yet another exemplary embodiment of the present disclosure.

FIG. 13 is a cut-away perspective view of a control moment gyroscope according to yet another exemplary embodiment of the present disclosure.

According to yet another exemplary embodiment, the control moment gyroscope as illustrated in FIG. 13 is almost similar to that according to the exemplary embodiment described above, except for the shape of the flywheel 5130. Accordingly, the flywheel 5130 is mainly described below.

The flywheel 5130 may roughly have a rugby ball shape. Specifically, the flywheel 5130 in the rugby ball shape may gradually increase in diameter and then gradually decrease in diameter in the direction of momentum of the gimbal motor 110.

Accordingly, the overall diameter of the control moment gyroscope can be further reduced compared to the sphere- or circular plate-shaped flywheel.

Hereinbelow, a control moment gyroscope according to yet another exemplary embodiment of the present disclosure will be described with reference to FIG. 14.

Figure 14:
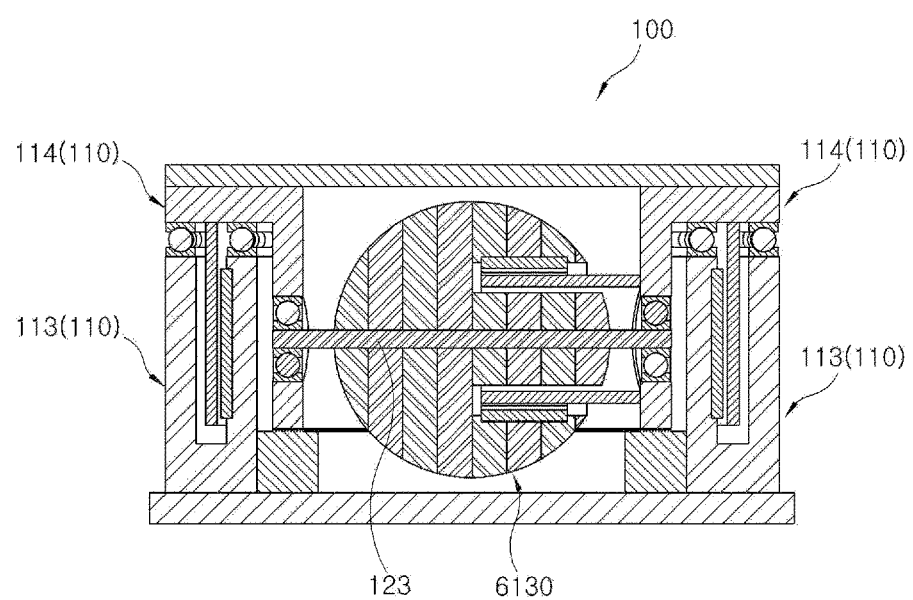
FIG. 14 is a cross sectional view of a control moment gyroscope according to yet another exemplary embodiment of the present disclosure.

FIG. 14 is a cross sectional view of a control moment gyroscope according to yet another exemplary embodiment of the present disclosure.

According to yet another exemplary embodiment, the control moment gyroscope as illustrated in FIG. 14 is almost similar to that according to the exemplary embodiment described above, except for the shape of the flywheel 6130. Accordingly, the flywheel 6130 is mainly described below.

The flywheel 6130 may consist of a plurality of circular plates stacked on one another. Specifically, the flywheel 6130 may roughly have a sphere shape in which a plurality of circular plates are stacked on one another in the shaft direction of the spin shaft 123.

Accordingly, fabrication of a sphere-shaped configuration, which is difficult to perform in one single processing, can be facilitated with the use of a plurality of circular plates.

Hereinbelow, a control moment gyroscope according to yet another exemplary embodiment of the present disclosure will be described with reference to FIG. 15.

Figure 15:
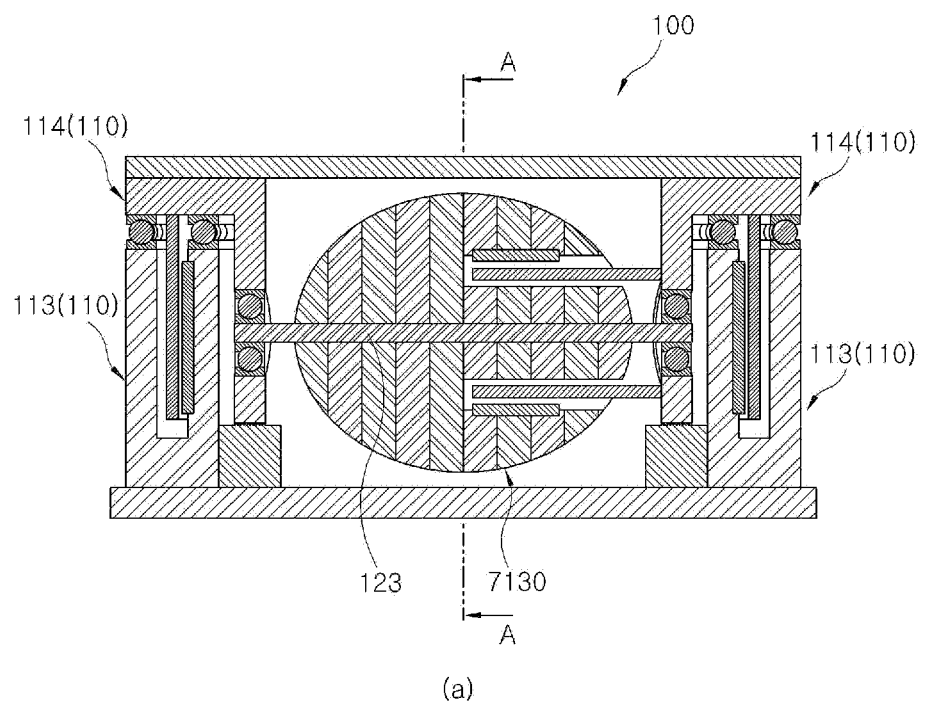
FIG. 15 is a cross sectional view of a control moment gyroscope according to yet another exemplary embodiment of the present disclosure.
Figure 15:
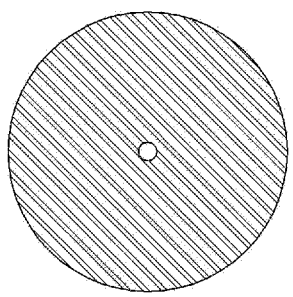

FIG. 15 is a cross sectional view of a control moment gyroscope according to yet another exemplary embodiment of the present disclosure.

According to yet another exemplary embodiment, the control moment gyroscope as illustrated in FIG. 15 is almost similar to that according to the exemplary embodiment described above, except for the shape of the flywheel 7130. Accordingly, the flywheel 7130 is mainly described below.

The flywheel 7130 may consist of a plurality of circular plates stacked on one another. Specifically, the flywheel 7130 may roughly have a rugby ball shape in which a plurality of circular plates are stacked on one another in the shaft direction of the spin shaft 123.

Accordingly, fabrication of a rugby ball shape configuration, which is difficult to perform in one single processing, can be facilitated with the use of a plurality of circular plates, and the overall height of the control moment gyroscope can be further reduced compared to the sphere-shaped flywheel.

Hereinbelow, a control moment gyroscope according to yet another exemplary embodiment of the present disclosure will be described with reference to FIG. 16.

Figure 16:
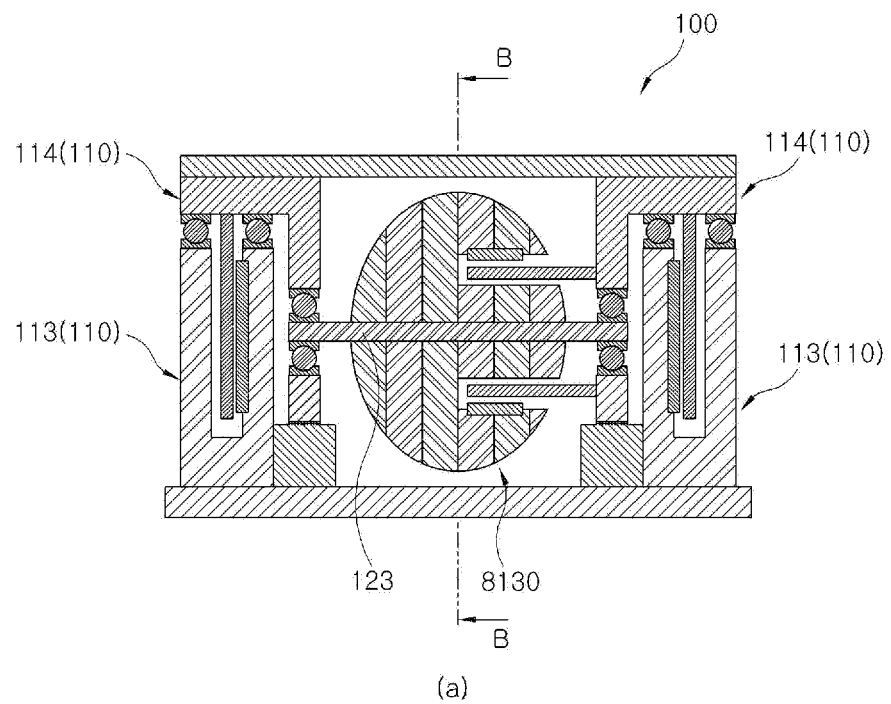
FIG. 16 is a cross sectional view of a control moment gyroscope according to yet another exemplary embodiment of the present disclosure.
Figure 16:
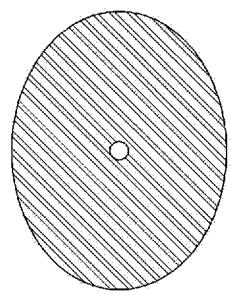

FIG. 16 is a cross sectional view of a control moment gyroscope according to yet another exemplary embodiment of the present disclosure.

According to yet another exemplary embodiment, the control moment gyroscope as illustrated in FIG. 16 is almost similar to that according to the exemplary embodiment described above, except for the shape of the flywheel 8130. Accordingly, the flywheel 8130 is mainly described below.

The flywheel 8130 may consist of a plurality of elliptic plates stacked on one another. Specifically, the flywheel 8130 may roughly have a rugby ball shape in which a plurality of elliptic plates are stacked on one another in the shaft direction of the spin shaft 123.

Accordingly, fabrication of a rugby ball shape configuration, which is difficult to perform in one single processing, can be facilitated with the use of a plurality of elliptic plates, and the overall diameter of the control moment gyroscope can be further reduced compared to the sphere-shaped flywheel.

Hereinbelow, a control moment gyroscope according to yet another exemplary embodiment of the present disclosure will be described with reference to FIG. 17.

Figure 17:
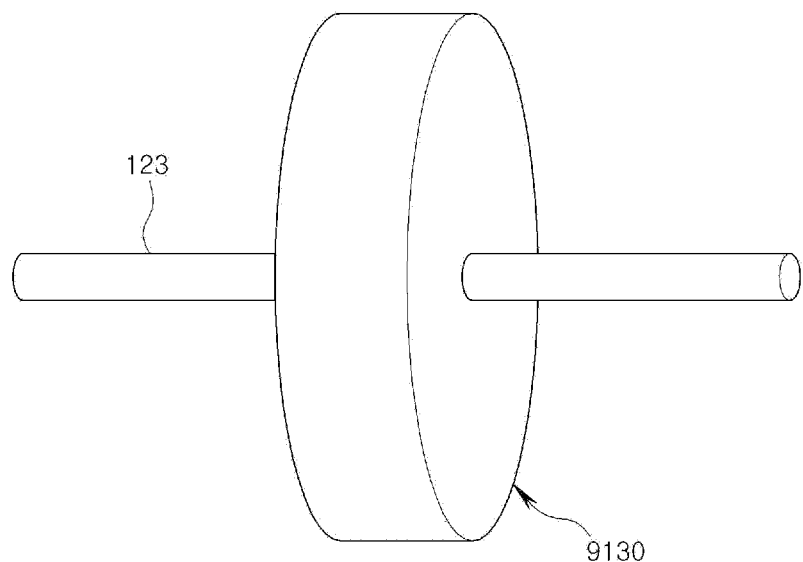
FIG. 17 is a perspective view illustrating main portions of a control moment gyroscope according to yet another exemplary embodiment of the present disclosure.

FIG. 17 is a perspective view illustrating main portions of a control moment gyroscope according to yet another exemplary embodiment of the present disclosure.

According to yet another exemplary embodiment, the control moment gyroscope as illustrated in FIG. 17 is almost similar to that according to the exemplary embodiment described above, except for the shape of the flywheel 9130. Accordingly, the flywheel 9130 is mainly described below.

The flywheel 9130 may have a circular (or elliptic) plate shape, and the circular (or elliptic) plate-shaped flywheel 9130 may be positioned with the planar surface thereof being penetrated by the spin shaft 123. That is, the circular (or elliptic) plate-shaped flywheel 9130 may be positioned so that the center axes of the circular (or elliptic) plates are in agreement with the shaft direction of the spin shaft 123.

Accordingly, the weight and so on can be further reduced compared to the sphere-shaped flywheel, and it is also possible to further reduce the overall diameter of the control moment gyroscope compared to the sphere- or circular plate-shaped flywheel.

Hereinbelow, a control moment gyroscope according to yet another exemplary embodiment of the present disclosure will be described with reference to FIG. 18.

Figure 18:
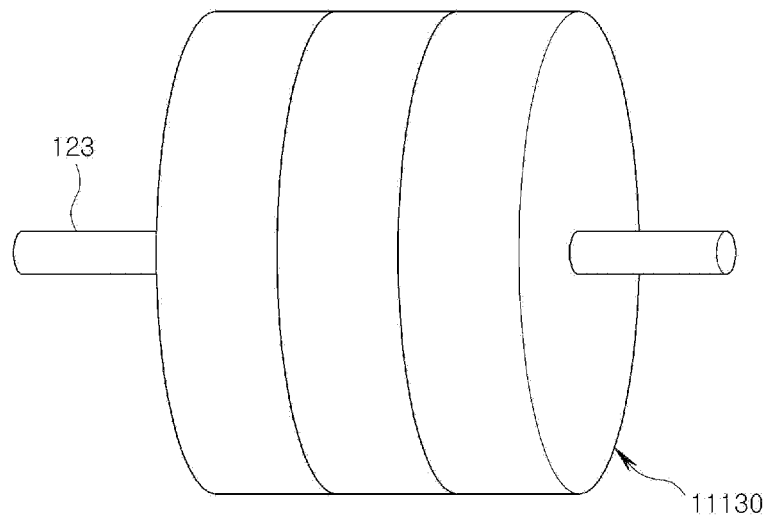
FIG. 18 is a perspective view illustrating main portions of a control moment gyroscope according to yet another exemplary embodiment of the present disclosure.

FIG. 18 is a perspective view illustrating main portions of a control moment gyroscope according to yet another exemplary embodiment of the present disclosure.

According to yet another exemplary embodiment, the control moment gyroscope as illustrated in FIG. 18 is almost similar to that according to the exemplary embodiment described above, except for the shape of the flywheel 11130. Accordingly, the flywheel 11130 is mainly described below.

The flywheel 11130 may consist of a plurality of circular (or elliptic) plates stacked on one another. Specifically, the flywheel 11130 may roughly have a cylindrical (or cylindroid) shape in which a plurality of circular (or elliptic) plates are stacked on one another in the shaft direction of the spin shaft 123.

Accordingly, the weight of the flywheel 11130 can be adjusted with a simple way of adjusting the number of a plurality of circular (or elliptic) plates.

Hereinbelow, a control moment gyroscope according to yet another exemplary embodiment of the present disclosure will be described with reference to FIG. 19.

Figure 19:
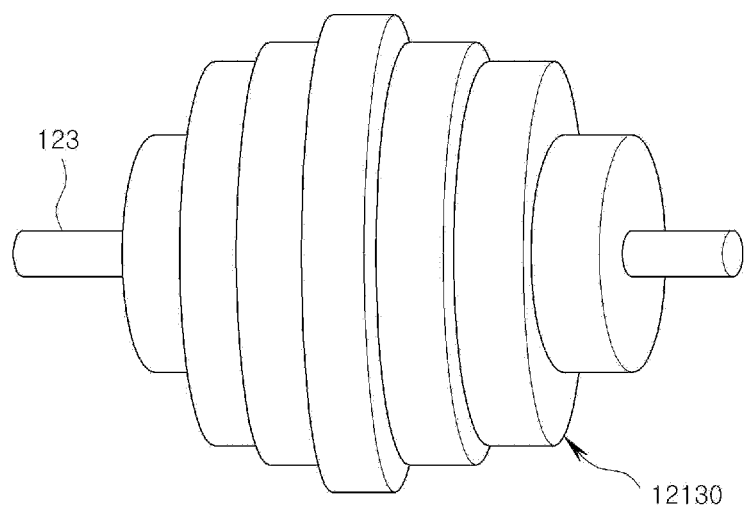
FIG. 19 is a perspective view illustrating main portions of a control moment gyroscope according to yet another exemplary embodiment of the present disclosure.

FIG. 19 is a perspective view illustrating main portions of a control moment gyroscope according to yet another exemplary embodiment of the present disclosure.

According to yet another exemplary embodiment, the control moment gyroscope as illustrated in FIG. 19 is almost similar to that according to the exemplary embodiment described above, except for the shape of the flywheel 12130. Accordingly, the flywheel 12130 is mainly described below.

The flywheel 12130 may consist of a plurality of circular (or elliptic) plates stacked on one another. Specifically, a plurality of circular (or elliptic) plates of the flywheel 12130, each in a stepped form, may be stacked on one another along the shaft direction of the spin shaft 123. For example, as illustrated in FIG. 19, the plurality of circular (or elliptic) plates may have the shape such that the diameters thereof gradually increase and then gradually decrease in the shaft direction of the spin shaft 123.

Such stepped configuration facilitates fabrication process, as it is not necessary to form slopes on the outer circumference when the respective circular (or elliptic) plates are fabricated. Further, since the respective circular (or elliptic) plates are provided in various diameters, the weight of the flywheel 12130 can be adjusted with increased accuracy.

As described above, the control moment gyroscope 100 according to exemplary embodiments have effects as follows.

According to exemplary embodiments, the optimized technical configuration is provided, in which the gimbal motor 110 has a hollow cylindrical shape, and the spin motor 120 and the flywheel 130 are mounted inside the gimbal motor 110. Accordingly, the volume is reduced without compromising performance, and the control moment gyroscope can be mounted even in a limited space. Ultimately, the control moment gyroscope 100 according to the exemplary embodiments can be mounted even in a limited space, thus allowing application as an actuator for small satellite. Further, maximized convenience can be provided in maintaining flexibility of arranging several control moment gyroscopes and performing repair and maintenance works.

Further, according to exemplary embodiments, the overall cylindrical shape can lead to maximized structural symmetry.

Further, according to exemplary embodiments, the spin motor 120 is mounted inside the hollow cylindrical gimbal motor 110, thus forming an overall structure that is closed by the gimbal motor 110. Accordingly, structural integrity and stability against micro-vibration can be enhanced, and heat sink ability for the heat generated from the motor as it is driven can also be enhanced.

Further, according to exemplary embodiments, the upper cover 140 and the lower cover 150 are additionally included, which can lead into maximized contamination prevention and stability against external environment.

Further, according to exemplary embodiments, the flywheel can have a variety of shapes, according to which weight of the flywheel, and height or diameter of the control moment gyroscope can be reduced. Specifically, in an embodiment where a plurality of circular or elliptic plates is used to fabricate the flywheel, fabrication of sphere- or rugby ball-shaped control moment gyroscope, which is hard to fabricate in one single processing, can be facilitated.

The foregoing exemplary embodiments and advantages are merely exemplary and are not to be construed as limiting the exemplary embodiments. The present teaching can be readily applied to other types of apparatuses. Also, the description of the exemplary embodiments of the present inventive concept is intended to be illustrative, and not to limit the scope of the claims.

INDUSTRIAL APPLICABILITY

The present disclosure is applicable to a vehicle and a floating platform such as satellite, ship, submarine, automobile, aircraft, missiles, and so on.

What is claimed is:

1. A control moment gyroscope for rotating two shafts disposed perpendicular to each other and generating torque in a direction orthogonal to both of the shafts, comprising:
   a gimbal motor having a hollow cylindrical shape and supplying momentum;
   a spin motor provided in an inside of the gimbal motor and supplying momentum in a direction perpendicular to the momentum of the gimbal motor; and
   a flywheel provided in the inside of the gimbal motor and supplied with a rotating force of the gimbal motor and a rotating force of the spin motor,
   wherein the gimbal motor comprises:
   a first stator having a hollow cylindrical shape with a coil wound thereon;
   a first rotor in a hollow cylindrical shape, being provided at a gap with respect to the first stator, and having a permanent magnet;
   a first stator support in a hollow cylindrical shape and supporting the first stator; and
   a first rotor support supporting the first rotor, being rotatably provided on the first stator support, and comprising an insertion inserted into the first stator support, and
   wherein the first stator support and the first rotor support form a portion of an outer circumference of the control moment gyroscope.

2. The control moment gyroscope of claim 1, wherein the first stator support comprises a first guidance passage in an annular shape recessed in a direction of momentum of the gimbal motor,
   the first stator is fixed to the first guidance passage, and
   the first rotor is rotatably inserted into the first guidance passage.

3. The control moment gyroscope of claim 1, further comprising:
   an upper cover covering an upper opening of the gimbal motor; and
   a lower cover covering a lower opening of the gimbal motor.

4. The control moment gyroscope of claim 3, wherein the insertion of the first rotor support is rotatably supported on the lower cover through a slip ring.

5. The control moment gyroscope of claim 1, wherein the spin motor comprises:
   a second stator in a hollow cylindrical shape with a coil wound thereon, being fixed to the insertion, and protruding in a direction perpendicular to the direction of momentum of the gimbal motor;
   a second rotor in a hollow cylindrical shape, being provided at a gap with respect to the second stator and supported on the flywheel, and comprising a permanent magnet; and
   a spin shaft rotatably provided in the insertion, forming a center of rotation of the flywheel, and having a direction perpendicular to the direction of momentum of the gimbal motor.

6. The control moment gyroscope of claim 5, wherein the flywheel comprises a second guidance passage in an annular shape recessed in the direction of momentum of the spin motor, the second stator is inserted into the second guidance passage while allowing the flywheel to rotate, and the second rotor is fixed to the second guidance passage.

7. The control moment gyroscope of claim 6, wherein the flywheel has a sphere shape.

8. The control moment gyroscope of claim 6, wherein the flywheel has a circular plate or elliptic plate shape.

9. The control moment gyroscope of claim 8, wherein the flywheel is positioned in a configuration in which an outer circumference thereof is penetrated by the spin shaft.

10. The control moment gyroscope of claim 8, wherein the flywheel is positioned in a configuration in which a center of a flat surface thereof is penetrated by the spin shaft.

11. The control moment gyroscope of claim 6, wherein the flywheel has an elliptic plate shape elongated in a shaft direction of the spin shaft, or has the elliptic plate shape elongated in the direction of momentum of the gimbal motor.

12. The control moment gyroscope of claim 6, wherein the flywheel has a rugby ball shape which is gradually increased in diameter and then gradually decreased in diameter in a shaft direction of the spin shaft, or has the rugby ball shape which is gradually increased in diameter and then gradually decreased in diameter in the direction of momentum of the gimbal motor.

13. The control moment gyroscope of claim 6, wherein the flywheel consists of a plurality of circular plates or elliptic plates stacked on one another.

14. The control moment gyroscope of claim 13, wherein the plurality of circular plates or the elliptic plates, each in stepped form, are stacked on one another along a shaft direction of the spin shaft.

15. The control moment gyroscope of claim 6, wherein the flywheel has any of a cylindrical shape, a sphere shape and a rugby ball shape in which a plurality of circular plates are stacked on one another in a shaft direction of the spin shaft.

16. The control moment gyroscope of claim 6, wherein the flywheel has a cylindroid shape or a rugby ball shape in which a plurality of elliptic plates are stacked on one another in a shaft direction of the spin shaft.

* * * * *